United States Patent
Herzl

[11] 3,885,432
[45] *May 27, 1975

[54] VORTEX-TYPE MASS FLOWMETERS

[75] Inventor: Peter J. Herzl, Morrisville, Pa.

[73] Assignee: Fischer & Porter Company, Warminster, Pa.

[ * ] Notice: The portion of the term of this patent subsequent to Dec. 4, 1990, has been disclaimed.

[22] Filed: Aug. 2, 1973

[21] Appl. No.: 384,792

Related U.S. Application Data

[63] Continuation-in-part of Ser. No. 232,058, March 6, 1972, Pat. No. 3,776,033.

[52] U.S. Cl. .................. 73/194 B; 328/26; 329/112
[51] Int. Cl.² ........................ G01F 1/00; G01P 5/08
[58] Field of Search ...... 73/194 B, 194 M; 307/232; 328/26, 134; 329/112, 122

[56] References Cited
UNITED STATES PATENTS

| | | | |
|---|---|---|---|
| 2,897,379 | 7/1959 | Hinsdale | 307/232 |
| 3,138,955 | 6/1964 | Uttley | 73/194 X |
| 3,251,226 | 5/1966 | Tushing | 73/194 X |
| 3,355,944 | 12/1967 | Sipin | 73/194 |
| 3,478,602 | 11/1969 | Tatum | 73/462 |
| 3,553,566 | 1/1971 | Nagy | 328/26 |
| 3,659,210 | 4/1972 | Nilsson | 328/134 |

Primary Examiner—Herbert Goldstein

[57] ABSTRACT

A vortex-type mass flowmeter for accurately measuring the mass of fluid passing through a flow tube, the meter being insensitive to background noise resulting from turbulence in the fluid admitted into the flow tube. A bluff body or other means disposed within the tube acts to create a pulsatory fluidic vortex therein whose frequency varies as a function of the volumetric flow rate of the fluid being measured. Placed within the flow tube is a pressure-responsive transducer adapted to generate an electrical signal whose fundamental frequency is proportional to the fluidic pulse rate and whose amplitude is a function of the kinetic energy contained in the vortex. The transducer signal is processed by an operational amplifier, the gain of which is inversely proportional to frequency, thereby effectively dividing the transducer signal by frequency throughout the operating range of the meter to yield an output signal whose amplitude represents mass flow. The output signal is applied to an electronic signal recovery system to filter out all but the fundamental frequency whereby the indicator reading accurately indicates mass flow.

8 Claims, 9 Drawing Figures

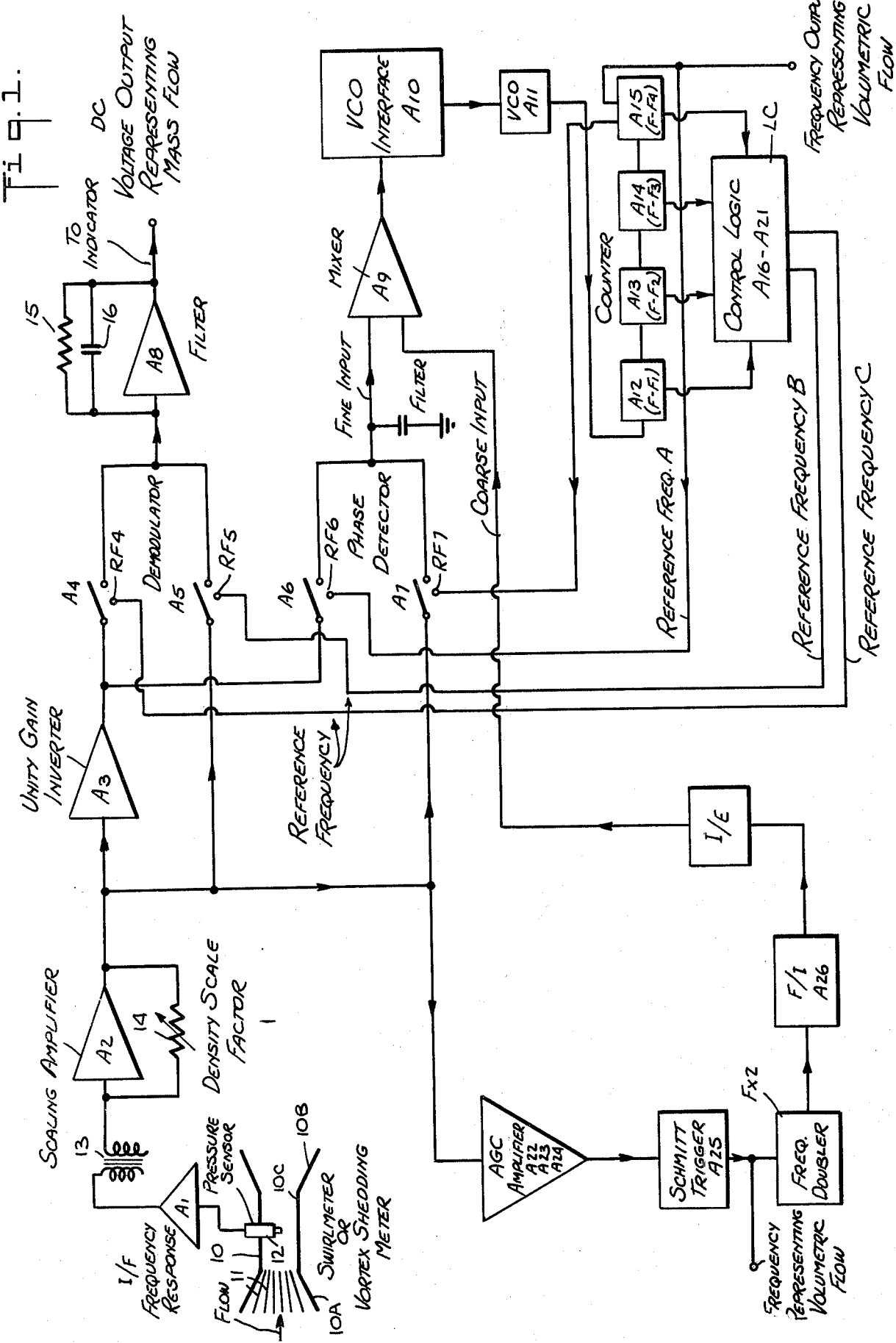

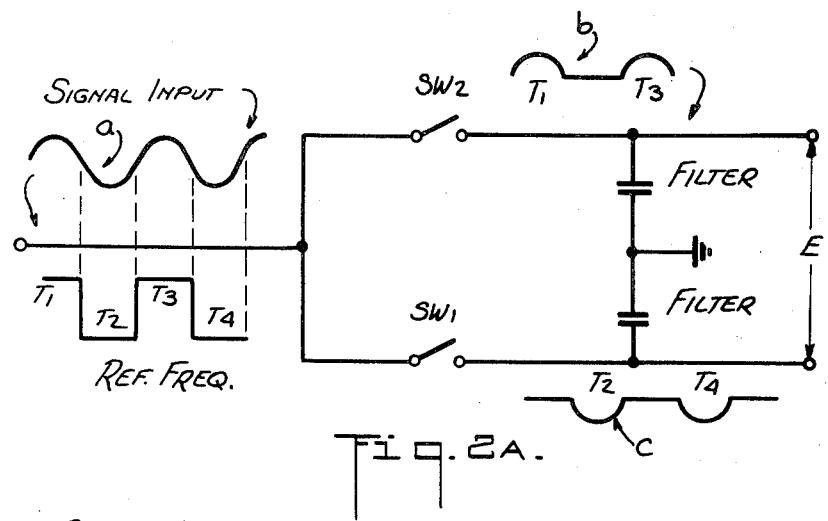
Fig. 2A.
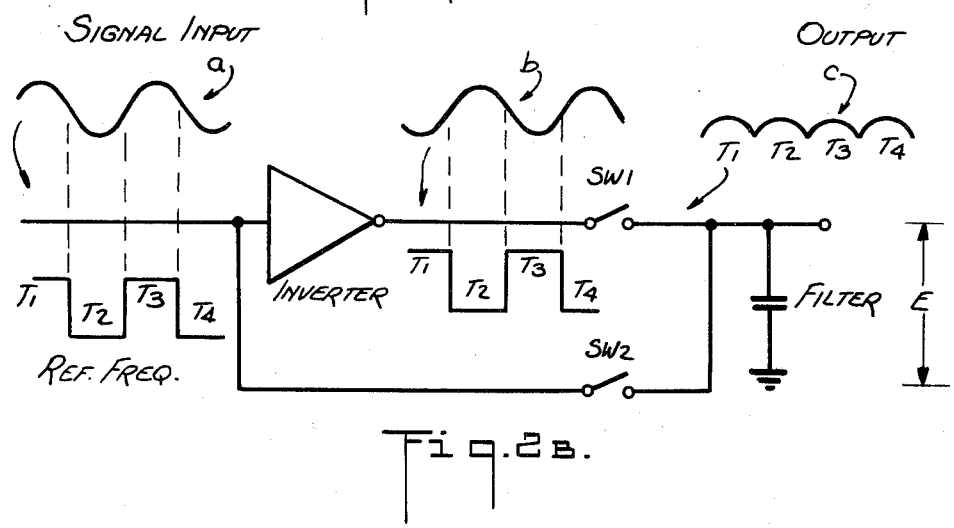
Fig. 2B.
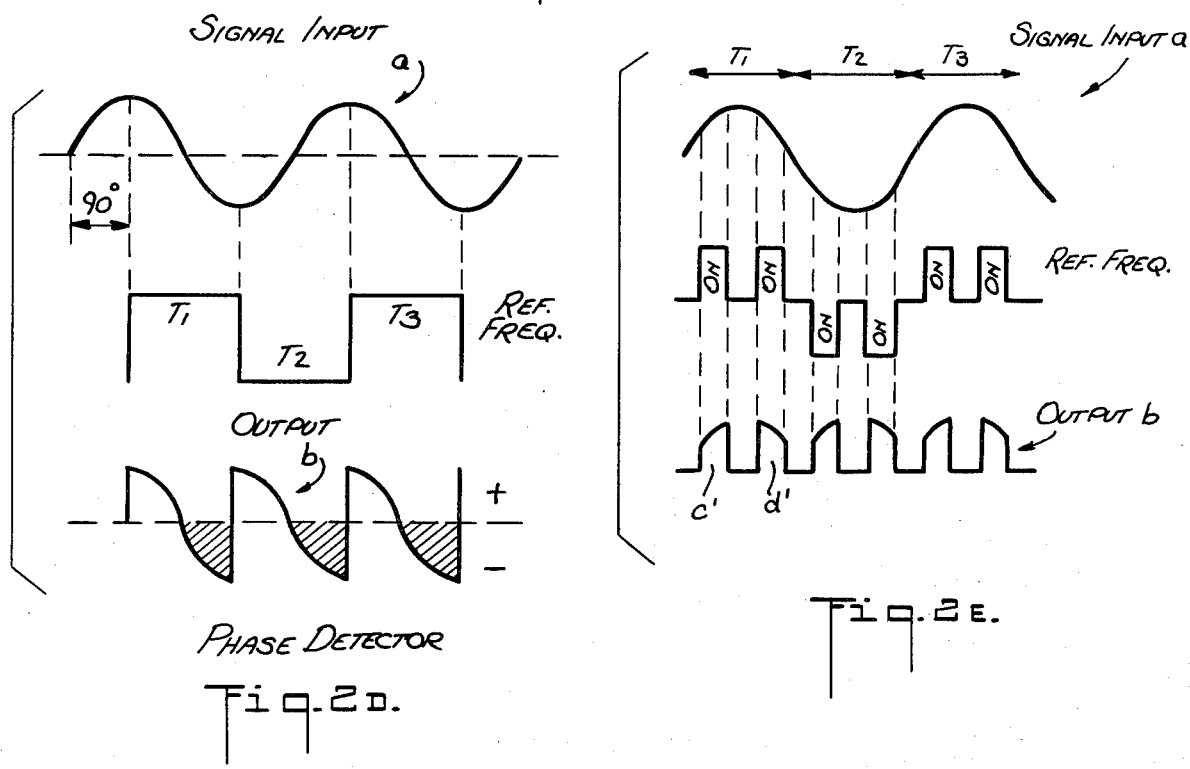
Fig. 2D.
Fig. 2E.

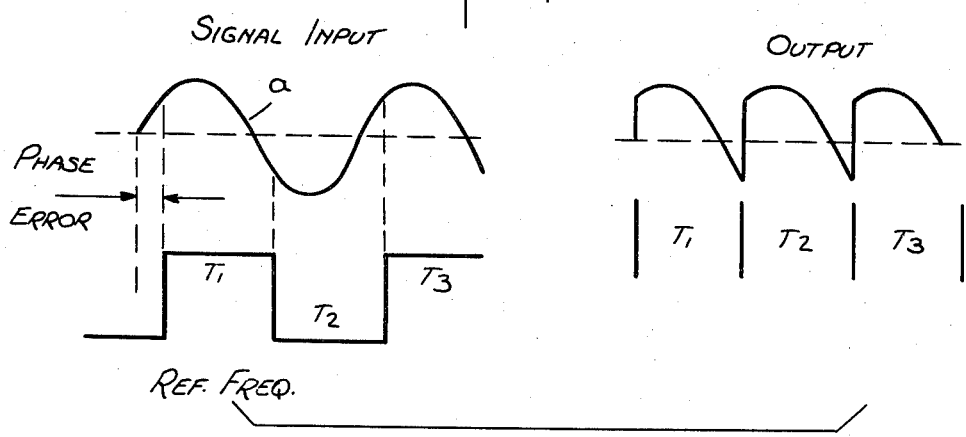
Fig. 2C.
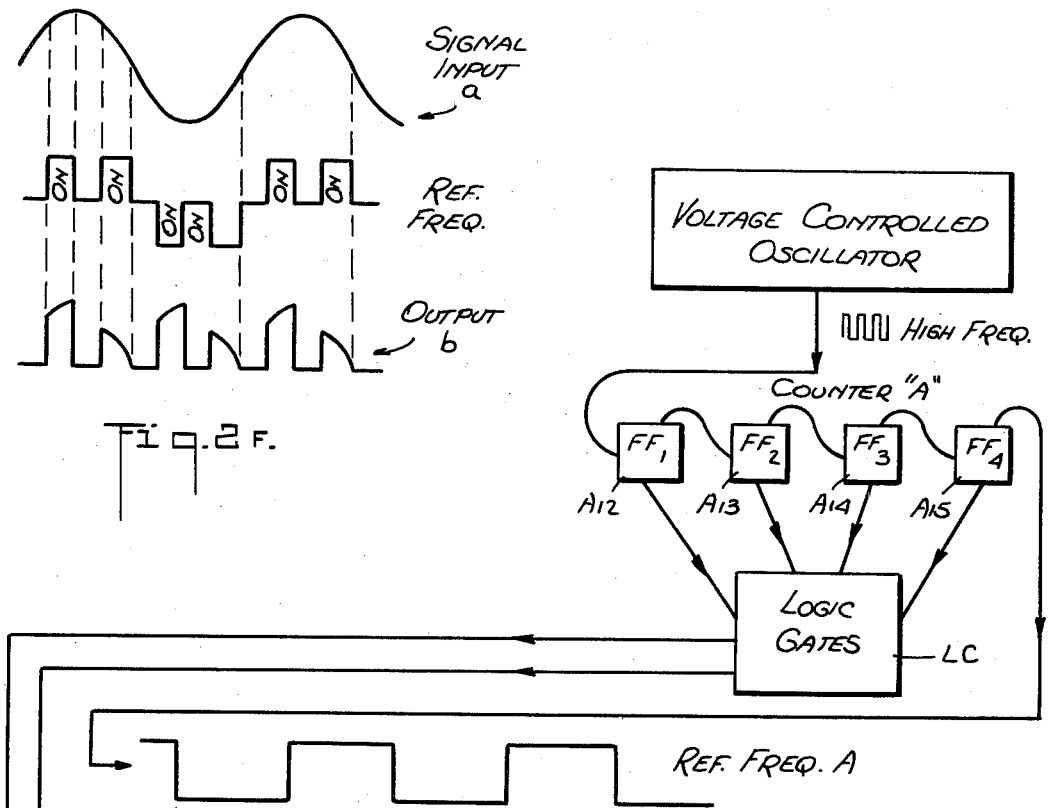
Fig. 2F.
Fig. 2B.

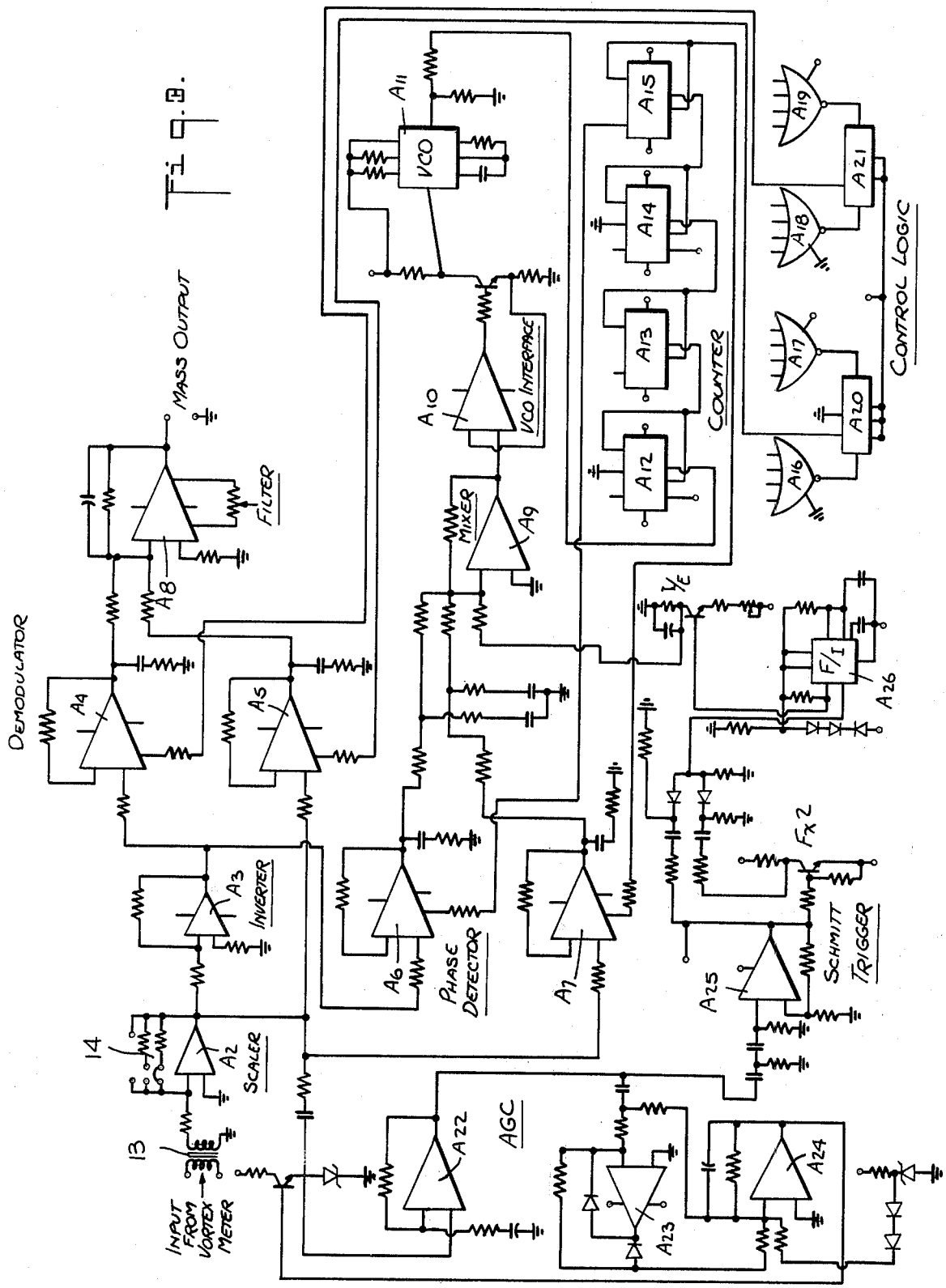

VORTEX-TYPE MASS FLOWMETERS

RELATED APPLICATION

This application is a continuation-in-part of my co-pending application Ser. No. 232,058 filed Mar. 6, 1972 now Patent No. 3,776,033.

BACKGROUND OF THE INVENTION

This invention relates generally to mass flow measurement, and in particular to a simple mass flowmeter of the vortex type having no moving parts, the meter being provided with a signal recovery system to separate background noise from the fundamental frequency generated by the meter.

In the many industrial processes, gas supply systems, and in various chemical applications, one must not only measure the volumetric flow of fluids being treated or supplied, but also the mass flow thereof. Thus in certain chemical applications, the quantities of reactants are best specified according to mass, and in metering combustible gas supplied to consumers, one must know the total mass of the gas supplied. When standard volumetric flowmeters are employed for this purpose, it is necessary to convert the volume measurement to a reading of mass flow.

This conversion is readily effected by multiplying the volume measurement by the density of the fluid being measured. Hence the volumetric flowmeter must include indicating means that is calibrated to account for the density factor. Since the density of a given fluid is a function of its temperature and pressure, should the meter be calibrated on the assumption that temperature and pressure is fixed at some value, the mass reading would be inaccurate by reason of inevitable fluctuations in temperature and pressure. Hence it has heretofore been necessary, in order to produce highly accurate mass flow readings, to determine the actual density of the fluid, rather than to assume an unchanging density value.

For example, in a mass flowmeter of the turbine type, a volumetric flowmeter operates in conjunction with a float densitometer to afford a mass flow reading. A permanent magnet attached to the turbine rotor, generates an alternating current in a fixed coil associated therewith, the frequency of the current being proportional to volumetric flow rate. A separate float acts to position an angular transducer which yields a D-C output proportional to fluid density. The signals from the densitometer and the turbine frequency converter are both fed to a computer, the output of which is the product of density and velocity or mass flow rate. A mass flowmeter of this type, because it employs a rotary turbine, has all of the many disadvantages of meters employing moving parts.

A preferred approach to the measurement of mass flow without using moving parts is that disclosed in the Chanaud U.S. Pat. No. 3,370,463, which incorporates a "Swirlmeter" as a volumetric flow measuring device, the Swirlmeter causing the fluid being measured to precess at a repetition rate or frequency proportional to flow rate. This precession is manifested by measurable pressure and temperature fluctations in the fluid, caused by the alternate conversion between hydrostatic energy and kinetic energy in the swirling fluid. The amplitude of the fluctuations is therefore proportional to the kinetic energy which is proportional to the product of the density of the fluid and the square of its flow velocity, while the frequency of these fluctuations is proportional to flow velocity. It is to be noted that the ratio of kinetic energy and flow velocity is proportional to the density of the fluid times the volume flow rate, and hence the mass flow rate.

By placing a sensor in the Swirlmeter adapted to detect the kinetic energy, and by converting the frequency and amplitude of these fluctuations into signals which are fed to a suitable operational arithmetic device, an output signal is generated that is proportional to the mass flow rate.

The Swirlmeter approach to mass flow measurement as disclosed in the Chanaud patent, has distinct advantages over meters of the type heretofore known, but it has the serious drawback of being excessively complex and costly from the electronic standpoint.

In the above-identified co-pending application there is disclosed a vortex-type flowmeter for measuring the mass density of a fluid without the use of moving parts and by means of inexpensive electronic circuits of simple design. By "vortex-type flowmeter" is meant any meter having a flow tube through which the fluid to be measured is conveyed, and incorporating stationary means to so modify fluid flow as to create a pulsatory vortex in the flow tube whose frequency is a function of flow velocity.

In the meter disclosed in said co-pending application a flow tube is interposed in a fluid line and an obstacle or other means is disposed in the flow path to create a pulsatory fluidic vortex whose frequency varies in accordance with the volumetric flow rate of the fluid being measured. Mounted within the flow tube is a pressure-responsive transducer preferably constituted by a piezo-electric element, adapted to generate an electrical signal whose frequency is proportional to the fluid velocity and whose amplitude is a function of the kinetic energy contained in the vortex.

The transducer signal is processed by an operational amplifier whose gain is inversely proportional to frequency, thereby dividing the transducer signal by frequency throughout the operating range of the meter to yield an output signal whose amplitude is indicative of mass flow. When subsequently divided by frequency by a second operational amplifier whose gain is inversely proportional to frequency, this output signal is indicative of fluid density. Total mass flow may be determined by integrating the output signal.

Though the amplitude of the output signal of the operational amplifier represents mass flow, under actual flow conditions the reading derived from this output signal may be inaccurate. The reason for this inaccuracy is that the pressure-responsive sensor, in addition to sensing pressure variations caused by the passage of vortices generated within the flow tube also detects pressure variations produced by turbulence in the flow introduced before the fluid to be metered enters the flow tube. As a consequence, background noise is developed which is spread over a broad frequency range. While the amplitude of this background noise is generally related to mass flow, it tends to be different for different meter installations and gives rise to a meter offset.

SUMMARY OF THE INVENTION

In view of the foregoing, it is the main object of this invention to provide a signal recovery system operating in conjunction with a mass flowmeter of the vortex type, the system acting to reject background noise components and to pass to the indicator only the fundamental frequency whose amplitude is indicative of mass flow whereby an accurate mass flow reading is obtained.

More specifically it is an object of this invention to provide a signal recovery system of the above-type, which includes a phase-sensitive, full-wave demodulator for filtering out all but the fundamental frequency. A significant feature of the invention is that the demodulator is designed for variable frequency operation and has a broad electrical band width, the demodulator acting in conjunction with a reference frequency source which is adapted to track the operating frequency of the flowmeter.

Yet another object of the invention is to provide an efficient and relatively inexpensive mass vortex-type flowmeter of exceptional accuracy, the meter having no moving parts.

Briefly stated, these objects are attained in a vortex-type mass flowmeter for accurately measuring the mass of fluid passing through a flow tube, the meter being insensitive to background noise resulting from turbulence or other flow disruptions introduced into the fluid before it enters the flow tube. A bluff body or other means disposed within the tube acts to create a pulsatory fluidic vortex therein whose frequency is a function of flow rate. A pressure or force-responsive sensor in the flow tube generates an electrical signal whose fundamental frequency is proportional to the fluidic pulse rate and whose amplitude is a function of the kinetic energy contained in the vortex.

The sensor signal is fed to an operational amplifier whose gain is inversely proportional to frequency to yield an output signal the amplitude of which represents mass flow, the signal containing background noise components resulting from said turbulence. To reject this background noise, the output signal is applied to a signal recovery system having a phase-sensitive, full-wave demodulator operating in conjunction with a reference frequency source that tracks the fundamental frequency produced by the sensor to pass only the signal representing mass flow.

OUTLINE OF THE DRAWINGS

For a better understanding of the invention as well as other objects and further features thereof, reference is made to the following detailed description to be read in conjunction with the accompanying drawings, wherein:

FIG. 1 is a block diagram of a mass flowmeter provided with a signal recovery system in accordance with the invention;

FIGS. 2 A to G illustrate the behavior of the demodulator and the phase comparator included in the system; and FIG. 3 is a schematic diagram of the system.

DESCRIPTION OF THE INVENTION

Mass Flowmeter

A mass flowmeter in accordance with the invention, makes use of any known form of volumetric flowmeter of the vortex type, in conjunction with a pressure or force-responsive sensor whose output is applied to an operational amplifier having a gain inversely related to the frequency of the applied signal. In the absence of background noise, the amplifier yields an output signal proportional to the mass flow rate of the fluid being measured.

A vortex-type flowmeter is adapted to measure the flow rate of a fluid passing through a conduit by producing fluidic pulses or oscillations whose repetition rate or frequency varies in accordance with flow rate. Two species of vortex-type meters are commercially available in the United States, one being the so-called Swirlmeter type, and another, the bluff-body type. The present invention is not limited to these specific types and is applicable to all forms of hydrodynamic oscillatory metering devices in which fluidic variations are sensed to provide an indication.

In Swirlmeters, such as those described in U.S. Pat. Nos. 3,370,463, 3,279,251, 3,314,289 and Re. 26,410, among others, a homogenous fluid whose flow rate is to be measured, is forced to assume a swirl component. This is accomplished by feeding the fluid into the inlet section of a flow tube having a fixed set of swirl blades therein which imparts a swirling motion to the fluid passing therethrough. Downstream of the swirl blades in the tube, is a Venturi section which first constricts and then expands the flow passage to transform the swirling motion into precessional movement in the expanding region of the Venturi section to create a vortex.

In the obstacle or bluff-body type of vortex meter, such as that described in U.S. Nos. 3,116,639 and 3,587,312, the body is mounted within the flow conduit transversely with respect to the flow axis thereof to create fluidic oscillations whose frequency is proportional to flow rate. The present invention encompasses all existing types of vortex meters, but for purposes of disclosure, the invention will be described in connection with a Swirlmeter.

Referring now to FIG. 1, a Swirlmeter which includes a pressure sensor probe assembly and a signal processing circuit, comprises a meter body constituted by a flow conduit or tube 10 having mounting flanges at either end thereof to facilitate the interposition of the meter in a line whose fluid is to be metered. The fluid may be any homogeneous fluid or gas. In practice, the sensor may be force-responsive, such as a strain gauge plate assembly.

Flow tube 10 is constituted by a cylindrical inlet section 10A, a cylindrical outlet section 10B, and an intermediate section 10C interconnecting the inlet and outlet sections, which section may be in venturi form. The Venturi serves to constrict the flow coming from the inlet section and to expand flow in advance of the outlet section. Mounted within inlet section 10A is a fixed array of curved swirl blades 11 radiating from a hub. To provide a strong signal and a high information rate, the curvature of the swirl blades is made such as to significantly deflect the incoming flow of fluid with respect to the longitudinal axis of flow tube 10.

Thus fluid entering inlet section 10A is forced by the array of swirl blades to assume a swirling motion, the swirling fluid being directed into intermediate section 10C in which the swirling flow is converted into precessional motion about the longitudinal axis of the tube. The frequency of precession depends on the volumetric flow rate.

Cyclic variations in local fluid velocity, as a result of the precessional motion, are detected by a sensor assembly generally indicated by numeral 12. Sensor 12 is constituted by a probe which extends into intermediate section 10C at right angles to the longitudinal axis thereof and terminates in a pressure-responsive piezoelectric crystal transducer whose output voltage is varied periodically in response to fluidic pressure changes produced by the precessing fluid. In practice, the transducer may be mounted on a plug receivable in a socket mounted on the probe, to facilitate replacement thereof, when necessary.

In operation, pressure or force changes sensed by transducer 12 are converted into corresponding changes in amplitude in the signal generated by the transducer, the amplitude being a function of the kinetic energy contained in the fluid vortex in accordance with the following equation:

$$A = \frac{WV^2}{2g} = K_2 \times \text{density} \times f^2$$

where A is the amplitude of the transducer signal
W is the fluid mass
V is the fluid velocity
g is gravity
f is the signal frequency
$K_{1,2}$ are constants If therefore one divides signal amplitude (A) by frequency (f), there is obtained $K \times \text{density} \times f$, which equals mass flow. If we divide by $f^2$, we obtain $K \times$ density.

In order to divide the amplitude of the transducer signal by (f), the output of transducer 12 is applied to an operational amplifier $A_1$ which in practice may be contained in a suitable housing mounted on the Swirlmeter. The operational amplifier is provided with a frequency-responsive network imparting a $1/f$ characteristic to the amplifier. Hence the output of this amplifier is an A-C signal whose amplitude is indicative of mass flow.

In order to obtain accurate mass flow and density, the pressure transducer output as a measurement of kinetic energy must be substantially linear through the dynamic range of the Swirlmeter or whatever vortex-type meter is being used. Thus in the case of a Swirlmeter having a range of about 100 to 1000 Hz, the transducer linearity throughout this range should be about plus or minus 1 percent.

The Signal Recovery System

The output signal yielded by operational amplifier $A_1$ accurately represents mass flow in the conditions where only the amplitude of the fundamental frequency generated by the vortex meter is measured. But as pointed out previously, turbulence introduced in the fluid before it enters the flow tube gives rise to background noise that produces an error in the mass flow reading. A major advantage of a Swirlmeter or a vortex-shedding meter, when used for mass flow measurement, is that it is possible for an electronic signal recovery system associated therewith to separate the background noise or energy from the fundamental frequency by filtering out all but the fundamental frequency. This advantage is lacking in other energy-type mass flow systems.

Essentially, this separation is effected in an electronic system in accordance with the invention by means of a phase-sensitive, full-wave demodulator designed for variable frequency operation and having a widened electrical band width. In their standard forms, phase-sensitive demodulators are a well-known family of devices which change the in-phase component of a fixed A-C frequency to direct-current. The in-phase component is in relation to a known stable reference frequency which is used as one input to the demodulator.

The ability of a phase-sensitive demodulator to reject noise is well known. But because it normally operates at a fixed reference frequency, it acts as an extremely narrow bandwidth device. In a phase-sensitive demodulator in accordance with the invention, the device operates in conjunction with a noisy signal originating from a flowmeter ranging in frequency over as much as a 100 to 1 range with rapid frequency and amplitude changes. The demodulator acts in conjunction with a reference frequency source which tracks the operating frequency of the flowmeter and recovers only the amplitude of the fundamental frequency generated by the flowmeter so that an accurate reading of mass flow is obtained.

In an electronic system in accordance with the invention, the output signal from operational amplifier $A_1$ is fed through an isolation transformer 13 into a scaling amplifier $A_2$. Scaling amplifier $A_2$ is an operational amplifier with variable gain, allowing the full scale output to be set for various values of mass flow by means of a variable resistor 14.

The signal from scaling amplifier $A_2$ enters a phase-sensitive demodulator, represented by electronic switches $A_4$ and $A_5$, by two distinct routes. In one route, the signal passes through a unity gain inverter $A_3$ to electronic switch $A_4$ so that in this route, the signal is inverted. In the other route, the signal enters electronic switch $A_5$ directly; hence the applied signal is uninverted.

The demodulator constituted by electronic switches $A_4$ and $A_5$ functions with respect to that portion of the signal applied thereto which has the same frequency and the correct phase relationship in respect to a "Reference Frequency" applied to electronic switches $A_4$ and $A_5$ at input terminals $RF_4$ and $RF_5$. The demodulator acts to change this particular portion of the applied input signal to direct-current. This direct current is filtered by device $A_8$ which is provided with an R-C parallel network 15–16, the D-C output of device $A_8$ accurately representing mass flow.

In addition to this simple, signal flow arrangement, there is also a sub-system to establish a reference frequency which corresponds to and tracks the fundamental operating frequency of the meter, this reference frequency being required by the demodulator as a reference signal.

In the sub-system, the output from scaling amplifier $A_2$ enters an automatic-gain-control amplifier (AGC) made up of devices $A_{22}$, $A_{23}$ and $A_{24}$. Thus AGC amplifier yields a constant output voltage regardless of the amplitude of the input voltage. The output of AGC circuit is applied to a Schmitt trigger $A_{25}$ where the signal is changed to a square wave representing the fundamental frequency.

Because of noise present in the output of scaling amplifier $A_2$, the frequency of the Schmitt trigger may not exactly correspond to the fundamental frequency. But the existence of a small conversion error is unimportant in that the square-wave frequency produced by the Schmitt trigger is only used as a coarse setting of a voltage-controlled-oscillator (VCO) to be later described.

The square-wave output of Schmitt trigger $A_{25}$ is applied to a frequency doubler Fx2 whose output is fed to a frequency-to-current converter $A_{26}$. The output of the F/I converter is, in turn, changed to voltage in a current-to-voltage converter I/E whose output is fed as one input to a mixer $A_9$, this being the coarse input thereto.

The other input to mixer $A_9$, which is a fine input, comes from a phase comparator made up of electronic switches $A_6$ and $A_7$. Electronic switch $A_6$ is coupled to the output of inverter $A_3$ and electronic switch $A_7$ is coupled directly to the output of scaling amplifier $A_3$; hence the input of switch $A_6$ is inverted and that to $A_7$ is uninverted. Thus the input of switches $A_6$ and $A_7$ of the phase detector corresponds to the respective inputs to switches $A_4$ and $A_5$ of the demodulator. The phase comparator functions to compare the original frequency with a reference frequency yielded in the output stage $A_{15}$ of a counter and applied at terminals RF6 and RF7.

The output from mixer $A_9$ is fed to a voltage-controlled high-frequency oscillator $A_{11}$ through an interface module $A_{10}$. Since the frequency of the oscillator $A_{11}$ is controlled by the voltage developed by mixer $A_9$, this frequency is set to an approximate value by the coarse input to the mixer derived from Schmitt trigger $A_{25}$ and it is accurately set by the fine input derived from the phase detector ($A_6$–$A_7$).

The high-frequency output of voltage-controlled oscillator $A_{11}$ is applied to the first stage $A_{12}$ of a counter composed of flip-flop stages $A_{12}$, $A_{13}$, $A_{14}$, and $A_{15}$ in cascade relation, the stages dividing down the oscillator frequency to the operating frequency of the flowmeter. The output of the final stage $A_{15}$ which produces square-wave pulses at a repetition rate corresponding to the operating frequency of the flowmeter is applied to phase detector switches $A_6$ and $A_7$ to activate these switches at the same rate. A digital control logic (CL) coupled to the counter stages sets up the correct timing to activate electronic switches $A_4$ and $A_5$ of the demodulator.

Demodulator and Phase Comparator

The behavior of the demodulator and the phase comparator will now be explained in greater detail in connection with FIGS. 2A to G. As a starting point we refer to FIG. 2A which illustrates a basic demodulator circuit formed by electronic switches SWI and SW2. Applied to the common side of these switches is an input signal represented by $a$. If a square wave reference of the same frequency in phase with input signal $a$ is used such as to close switch $SW_2$ during the positive going periods $T_1$, $T_3$ etc., of the square wave and to close switch $SW_1$ during the negative-going periods $T_2$, $T_4$ etc., wave shapes $b$ and $c$ will be yielded by the switches. If these are filtered, a differential D-C voltage E will be produced across the filter, the voltage E representing the A-C amplitudes of the input signal $a$.

A variation of the demodulator arrangement is shown in FIG. 2B wherein the signal input to switch $SW_1$ is via an inverter, whereas the input to switch $SW_2$ is uninverted. The outputs of switches $SW_1$ and $SW_2$ are joined and then fed through a filter. Switches $SW_1$ and $SW_2$ are alternately closed by the square reference wave during periods $T_1$, $T_3$ and during periods $T_2$, $T_4$ in the same manner as in FIG. 2A. The output now becomes a single-ended D-C voltage representing the AC amplitude of the signal input $a$. The single-ended output is more convenient and all of the remaining figures (FIGS. 2C to G) refer to this configuration.

FIG. 2C shows the effect of a phase error between the signal and the reference frequency in the output of the demodulator (FIG. 2B). The output waveform $b$ shows a considerable reduction in output. To get a net output, the hatched area below the zero line, which is negative, must be subtracted from the positive area above the line.

FIG. 2D illustrates the behavior of the same demodulator working with a 90° phase error between the sinusoidal signal frequency and the square wave reference frequency. In this instance the net output of the demodulator is zero, for the net is obtained by subtracting the hatched negative area from the unhatched positive area whose area is equivalent to the negative area. This is very important, for the demodulator arrangement is used as a phase detector in the system according to the invention.

If the phase error becomes larger than 90°, the net output of the demodulator becomes negative and if the phase error becomes smaller, the net output becomes positive. When used for amplitude detection, a 90° out-of-phase reference is required. This is provided by the digital control logic CL which, as shown in FIG. 2G, generates two references with a 90° phase relationship therebetween.

As shown in FIG. 2G, the output of the last counter stage $A_{15}$ is a square-wave having a reference frequency A. The control logic (CL) which is coupled to the counter stages, provides a first reference frequency B which is 90° out of phase with reference frequency A, and a second reference frequency C which is 180° out of phase with reference frequency B.

The mechanism by which the demodulator acts to reject frequencies other than the reference frequency, can best be understood by imagining the signal frequency as free-running in relation to the reference. The demodulator will give a positive output, half time, and a negative output, half time, resulting in zero net output. A net output is not yielded except when the reference frequency is locked on a specific frequency.

FIGS. 2E and 2F show a variation of the demodulator that serves to reduce the effect of small phase errors between the signal frequency and the reference frequency. If switch $SW_2$ is turned on and off two times (during periods $T_1$, $T_3$ etc. of the reference frequency), and switch $SW_1$ is turned on and off two times (during periods $T_2$ and $T_4$ etc. of the reference frequency), the resultant wave form is that represented by wave form $b$ in FIG. 2E. But when there is a phase error between the signal frequency and the reference frequency the resultant takes the form of wave $b$ in FIG. 2F. It will be seen that one segment $c$ of wave form $b$ becomes larger while the next segment $d$ becomes smaller.

Depending on signal wave shape, phase error and the selection of an on-off pattern, the change in D-C output for a small phase error can be greatly reduced. Patterns other than the one illustrated can obviously be used. It is to be noted that with a 90° phase error, the output from the demodulator is still zero and noise rejection has therefore been fully maintained.

Referring again to FIG. 2G, the arrangement shown therein represents the present digital technique for generating the reference frequency wave forms required both for the demodulator and the phase comparator.

As pointed out previously, the phase comparator requires reference frequencies which are 90° out-of-phase with the reference frequencies applied to the demodulator. Since the reference frequency tracks the operating frequency of the flowmeter and changes with changes in flow rate, a fixed time increment cannot be used and a division of the reference frequency is required.

This requirement is satisfied by generating a high-frequency in voltage-controlled oscillator $A_{11}$ that is an integral multiple of the operating frequency. For example, oscillator $A_{11}$ may be arranged to oscillate at sixteen times the operating frequency of the flowmeter. This VCO frequency is then reduced to the operating frequency by counting down through four flip-flop stages, as shown, thereby dividing the VCO frequency into 16 parts. With suitable logic gating in the control logic CL, all of the necessary reference wave shapes and their phase relationships can now be produced by combining the outputs of the flip-flop stages in an appropriate manner.

Thus far we have assumed that the voltage-controlled-oscillator VCO will automatically be constrained to operate at the correct operating frequency. While this is true in systems covering a small frequency band, it is not necessarily true in a system covering a large frequency range, which is the present situation. There is, however, the possibility of locking-in on a harmonic of the basic operating frequency. The present design eliminates this possiblity.

The following example has been set up to illustrate the problem:

1. Let us assume that the phase comparator has a maximum output of ±3 volts.
2. Let us assume that the voltage-controlled-oscillator is a linear device having a frequency output of 1000 Hz for a 5 volt input and a 0 Hz output for a 0 volt input.
3. Let us assume that the phase detector will have one-quarter the output on first harmonics of the signal frequency or ±0.75 volt.
4. Let us assume that at the outset the system is at 1000 Hz.

By definition, the control input voltage to VCO oscillator $A_{11}$ equals 5 volts. Referring again to FIG. 1, this voltage is made up of a coarse input to mixer $A_9$ which will be almost 5 volts, plus a fine correcting voltage from the phase detector. Now let us assume a step change in frequency to 100 Hz. The coarse voltage input to $A_9$ will start to decay until it reaches 0.5 volts, the value for 100 Hz. As the system passes 200 Hz, the first higher harmonic, the phase detector, by definition, will develop and output of 0.75 volts. This, added to the 0.5 volt coarse input, is more than enough to produce the 1 volt required by oscillator $A_{11}$ to operate at 200 Hz and the system will then lock on this first harmonic. If the step change in frequency were larger, the problem would be even worse.

If the output of the phase detector were to be lowered, the situation would improve, but a larger phase error would remain between the signal frequency and reference frequency, as the loop gain of the fine correcting system has been decreased.

There is an additional problem of loop gain. When the voltage-controlled-oscillator dwells at 1000 Hz with an input voltage of 5 volts, the ±3 volt swing of the phase detector represents approximately a 60 percent frequency change for the oscillator. At 100 Hz, with an input voltage of 0.5 volt to the oscillator, the ±3 volt swing of the phase detector represents approximately a 600 percent frequency change to the oscillator. This represents a 10 to 1 change in system loop gain. Obviously, one or the other is not optimum.

In this system the problem is overcome by operating the phase detector in its proportional band and having a signal input which gets proportionately larger as the frequency goes up. Since the output of the phase detector when operated in the linear (proportional, non-saturated, non-clipped) mode varies directly with input signal amplitude, this solves both the false lock-in and variable loop gain problems. For example, the amplitude of the signal would give a phase detector sensitivity of ±3 volts at 1000 Hz and ±0.3 volts at 100 Hz.

Going back to our earlier numerical examples, it will be found that lock-in on harmonics can now not occur. Also, our loop gain at 100 Hz equals the loop gain at 1000 Hz. In systems where this frequency vs. amplitude relationship does not occur naturally, it can be created by suitable amplification.

The main advantage of the present technique is that the system is largely digital in nature. In FIG. 1, it will be seen that the only difficult analog elements in the signal path are the pressure sensor 12, the operational amplifier $A_1$ and the $1/f$ amplifier. Amplifiers $A_2$ and $A_3$ are simply fixed gain, flat frequency response, operational amplifiers. Devices $A_4$, $A_5$, $A_6$ and $A_7$ are electronic switches and device $A_8$ is a filter. This makes the system potentially accurate, almost adjustment free and relatively free from temperature shifts.

The most obvious approach to rejecting background noise would be to use a tracking bandpass filter followed by a rectifier to convert the signal output from operational amplifier $A_1$. But narrow band, tracking filters, with a fixed gain in their pass band at all frequencies, are extremely difficult to build and would be replete with adjustments and temperature-sensitive elements such as capacitors. An alternate approach would be to use a digital filter followed by a rectifier. The digital filter is very similar to the demodulator described, but additional rectification would be required after filtering.

FIG. 3 is the schematic diagram of an actual circuit arrangement for recovering the fundamental frequency from the output of operational amplifier $A_1$ coupled to the pressure sensor in the flowmeter while rejecting background noise components. The various stages in FIG. 3 which correspond to those in FIG. 1 are designated by corresponding reference numerals and the behavior of this circuit can be understood from the explanation made is connection with FIG. 1.

While there have been shown and described preferred embodiments of the invention it will be appreciated that many changes may be made therein without departing from the spirit of the invention as disclosed herein.

I claim:

1. Apparatus for measuring the mass flow of a fluid, said apparatus comprising:
    A. a vortex meter provided with a flow tube having an obstacle disposed in the flow path of fluid passing through the tube to produce a pulsatory fluidic vortex at a frequency which is a function of flow rate, and a pressure-responsive sensor detecting said fluidic pulses to produce an electrical signal at the same frequency, the amplitude of said signal being a function of the kinetic energy contained in said vortex, B. amplifier means coupled to said sensor and responsive to said electrical signal, said amplifier means having a gain which is inversely proportional to frequency, thereby dividing the electrical signal by frequency to produce an output signal having a fundamental frequency whose amplitude is indicative of mass flow, said output signal having a noise component representing turbulence introduced into said fluid before it enters said flow tube, and C. a signal recovery system coupled to said amplifier means to reject said noise component and to pass only said fundamental frequency to an indicator, whereby an accurate reading of mass flow is obtained.

2. A system as set forth in claim 1, wherein said means to reject said noise component is constituted by a phase-sensitive full-wave demodulator coupled to said amplifier means and responsive to said output signal, said demodulator operating in conjunction with a reference frequency source whose frequency corresponds to said fundamental frequency and varies therewith throughout the range of said meter whereby said demodulator rejects said noise component and passes said fundamental frequency to said indicator.

3. A system as set forth in claim 2, wherein said demodulator includes a pair of electronic switches having separate inputs and a common output which are rendered conductive in phase opposition by said reference frequency source, said output signal being applied to the separate inputs of said switches in phase opposition.

4. A system as set forth in claim 3, wherein said common output of said switches is coupled to a filter to produce a D-C output voltage representing mass flow.

5. A system as set forth in claim 4, wherein said reference frequency source includes a voltage-controlled high-frequency oscillator whose output frequency is divided down to produce a reference frequency corresponding to said fundamental frequency, the frequency of said oscillator being governed by a control voltage derived from said flowmeter output signal.

6. A system as set forth in claim 4, wherein said control voltage is yielded by a mixer, one input of which is a coarse control voltage derived from said output signal through a loop including a Schmitt trigger, the other input of which is a fine control voltage derived from a phase detector which compares the phase of the flowmeter output signal with the phase of the reference frequency source.

7. A system as set forth in claim 5, wherein the division of said high-frequency is effected by a series of counter stages.

8. A system as set forth in claim 7 further including a control logic coupled to said stages to produce a reference frequency for operating said phase detector.

* * * * *